US 12,143,512 B2

(12) United States Patent
Layouni et al.

(10) Patent No.: US 12,143,512 B2
(45) Date of Patent: Nov. 12, 2024

(54) CASCADED KEY DELEGATION SYSTEM FOR SHARING A DIGITAL KEY ASSOCIATED WITH A VEHICLE

(71) Applicant: GM Global Technology Operations LLC, Detroit, MI (US)

(72) Inventors: Mohamed A. Layouni, Fraser, MI (US); Jinzhu Chen, Troy, MI (US); Fan Bai, Ann Arbor, MI (US); Ying Li, Duluth, GA (US); Manohar Nemilikonda, Cumming, GA (US); Markus Jochim, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 17/810,393

(22) Filed: Jul. 1, 2022

(65) Prior Publication Data
US 2024/0007306 A1    Jan. 4, 2024

(51) Int. Cl.
*H04L 9/32* (2006.01)
*B60R 25/24* (2013.01)

(52) U.S. Cl.
CPC .......... *H04L 9/3268* (2013.01); *B60R 25/241* (2013.01); *H04L 2209/80* (2013.01); *H04L 2209/84* (2013.01)

(58) Field of Classification Search
CPC ............... H04L 9/3268; H04L 2209/80; H04L 2209/843; H04L 9/32; H04L 2209/84; B60R 25/241; B60R 25/24
See application file for complete search history.

(56) References Cited

U.S. PATENT DOCUMENTS

| | | | |
|---|---|---|---|
| 8,769,642 B1* | 7/2014 | O'Neill | H04L 63/0807 726/28 |
| 11,258,598 B2* | 2/2022 | Yang | H04L 9/0866 |
| 2004/0073801 A1* | 4/2004 | Kalogridis | H04L 9/50 713/176 |
| 2004/0168056 A1* | 8/2004 | Dillaway | G06F 21/10 713/156 |
| 2007/0094349 A1* | 4/2007 | Rits | G06F 21/62 713/176 |
| 2016/0347280 A1* | 12/2016 | Daman | G08C 17/02 |
| 2019/0363895 A1* | 11/2019 | Barr, III | H04L 67/568 |

* cited by examiner

*Primary Examiner* — Robert B Leung
*Assistant Examiner* — Howard H. Louie
(74) *Attorney, Agent, or Firm* — Vivacqua Crane, PLLC

(57) ABSTRACT

A method for sharing a digital key associated with a vehicle by a cascaded key delegation system includes issuing, by a requestor device, a public key certificate to an initial delegator device that is part of a cloud delegation service. The public key certificate enables the initial delegator device to grant delegation rights the vehicle. The method also includes issuing, by the initial delegator, an intermediate public key certificate to a subsequent delegator that is part of the cloud delegation service. The intermediate public key certificate grants the delegation rights to the subsequent delegator.

19 Claims, 3 Drawing Sheets

CASCADED KEY DELEGATION SYSTEM FOR SHARING A DIGITAL KEY ASSOCIATED WITH A VEHICLE

INTRODUCTION

The present disclosure relates to a cascaded key delegation system for sharing a digital key associated with a vehicle.

There are many occasions when an owner of a vehicle may need to loan his or her vehicle to another party. For example, if the owner's vehicle has enhanced cargo carrying capacity, then a friend may ask to borrow the owner's vehicle to move large items. In another example, the owner may be a corporate entity that loans the vehicle to a third party or an individual. Borrowing a vehicle may involve hand-off of a physical key or key fob that unlocks and starts the vehicle. However, sometimes it is difficult to coordinate the hand-off of the keys or key fob between the owner and the party wanting access to the owner's vehicle.

Digital key technology provides a user the ability to lock, unlock, start, and stop his or her vehicle using a smart device instead of a traditional physical key or key fob. While digital keys provide a more convenient approach to share access to a vehicle, it is to be appreciated that current digital key standards only support one level of sharing. That is, digital key standards only allow for the owner of the vehicle to grant access rights, and not delegation rights, to the vehicle. For example, if an owner lends the vehicle to a friend, then the friend may not share the digital key with another member of his or her family or another friend. However, many situations arise where multi-level cascade delegation of the digital key is required. For example, the owner may be a corporate entity that grants access rights to a third party, which is another corporate entity. In this example, the third party may not grant access rights to another entity or individual, such as a delivery driver.

Thus, while current digital keys achieve their intended purpose, there is a need in the art for an improved approach that allows for multi-level cascade delegation.

SUMMARY

According to several aspects, a method for sharing a digital key associated with a vehicle by a cascaded key delegation system is disclosed. The method includes issuing, by a requestor device, a public key certificate to an initial delegator device that is part of a cloud delegation service. The public key certificate enables the initial delegator device to grant delegation rights to the vehicle. The method also includes issuing, by the initial delegator, an intermediate public key certificate to a subsequent delegator that is part of the cloud delegation service, where the intermediate public key certificate grants the delegation rights to the subsequent delegator.

In another aspect, the subsequent delegator device is a last delegator device of the cloud delegation service, and the method includes issuing, by the last delegator, a leaf public key certificate to an end user device, where the leaf public key certificate indicates that the last delegator device endorses access rights to the vehicle.

In yet another aspect, the method includes submitting, by the end user device, a request for access to the requestor device.

In an aspect, in response to receiving the request for access, the method includes confirming, by the requestor device, a validity of the request for access, and in response to determining the request for access is valid, granting, by the requestor device, the access rights to the end user device.

In another aspect, the method includes confirming the validity of the request for access includes checking a certificate chain against a certificate revocation list.

In yet another aspect, the digital key at the requestor device is revoked, and the method comprises determining the access rights have already been granted to the end user device, and in response to determining that the access rights have already been granted to the end user device, revoking, by the requestor device, the access rights to the end user device.

In an aspect, the method further includes transmitting, by the requestor device, an updated certificate revocation list to one or more processors of the vehicle, where the updated certificate revocation list includes the end user device.

In an aspect, a cascaded key delegation system for sharing a digital key associated with a vehicle is disclosed and includes a requestor device authenticated by the vehicle to transmit service requests to one or more processors of the vehicle, where the requestor device is in wireless communication with a cloud delegation service including two or more delegator devices and a corresponding cloud counterpart associated with the requestor device that includes one or more remote servers. The one or more remote servers execute instructions to issue a public key certificate to an initial delegator device of the cloud delegation service, where the public key certificate enables the initial delegator device to grant delegation rights to a subsequent delegator device located downstream of the initial delegator device in the cloud delegation service.

In another aspect, the initial delegator device issues an intermediate public key certificate to the subsequent delegator device.

In yet another aspect, the cloud delegation service is in wireless communication with an end user device.

In an aspect, the subsequent delegator device issues a leaf public key certificate to the end user device, where the leaf public key certificate indicates that the subsequent delegator device endorses access rights to the vehicle.

In another aspect, the end user device submits a request for access to the requestor device.

In yet another aspect, the request for access includes the leaf public key certificate, a request for the access rights, and a certificate chain.

In an aspect, the certificate chain is an ordered list of public key certificates that start with the public key certificate and end with the leaf public key certificate, and where one or more intermediate public key certificates exist between the public key certificate and end with the leaf public key certificate.

In another aspect, the access rights are separate from the delegation rights to the vehicle.

In yet another aspect, the access rights allow for the end user device to perform one or more of the following: lock the vehicle, unlock the vehicle, start the vehicle, stop the vehicle, and access one or more systems and features available on the vehicle.

In an aspect, the cloud delegation service supports a limitless number of delegators.

In another aspect, a cascaded key delegation system for sharing a digital key associated with a vehicle is disclosed and includes a requestor device authenticated by the vehicle to transmit service requests to one or more processors of the vehicle and a cloud delegation service in wireless communication with the requestor device. The cloud delegation service includes two or more delegator devices. The cascaded key delegation system also includes one or more end user devices in wireless communication with the cloud delegation service, where the one or more end user devices are granted access rights to the vehicle. The cascaded key delegation system also includes a corresponding cloud counterpart associated with the requestor device, where the corresponding cloud counterpart includes one or more remote servers, and where the one or more remote servers execute instructions to issue a public key certificate to an initial delegator device of the cloud delegation service. The public key certificate enables the initial delegator device to grant delegation rights to a subsequent delegator device located downstream of the initial delegator device in the cloud delegation service.

In another aspect, the initial delegator device issues an intermediate public key certificate to the subsequent delegator device.

In yet another aspect, the subsequent delegator device issues a leaf public key certificate to the one or more end user devices, where the leaf public key certificate indicates that the subsequent delegator device endorses the access rights to the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
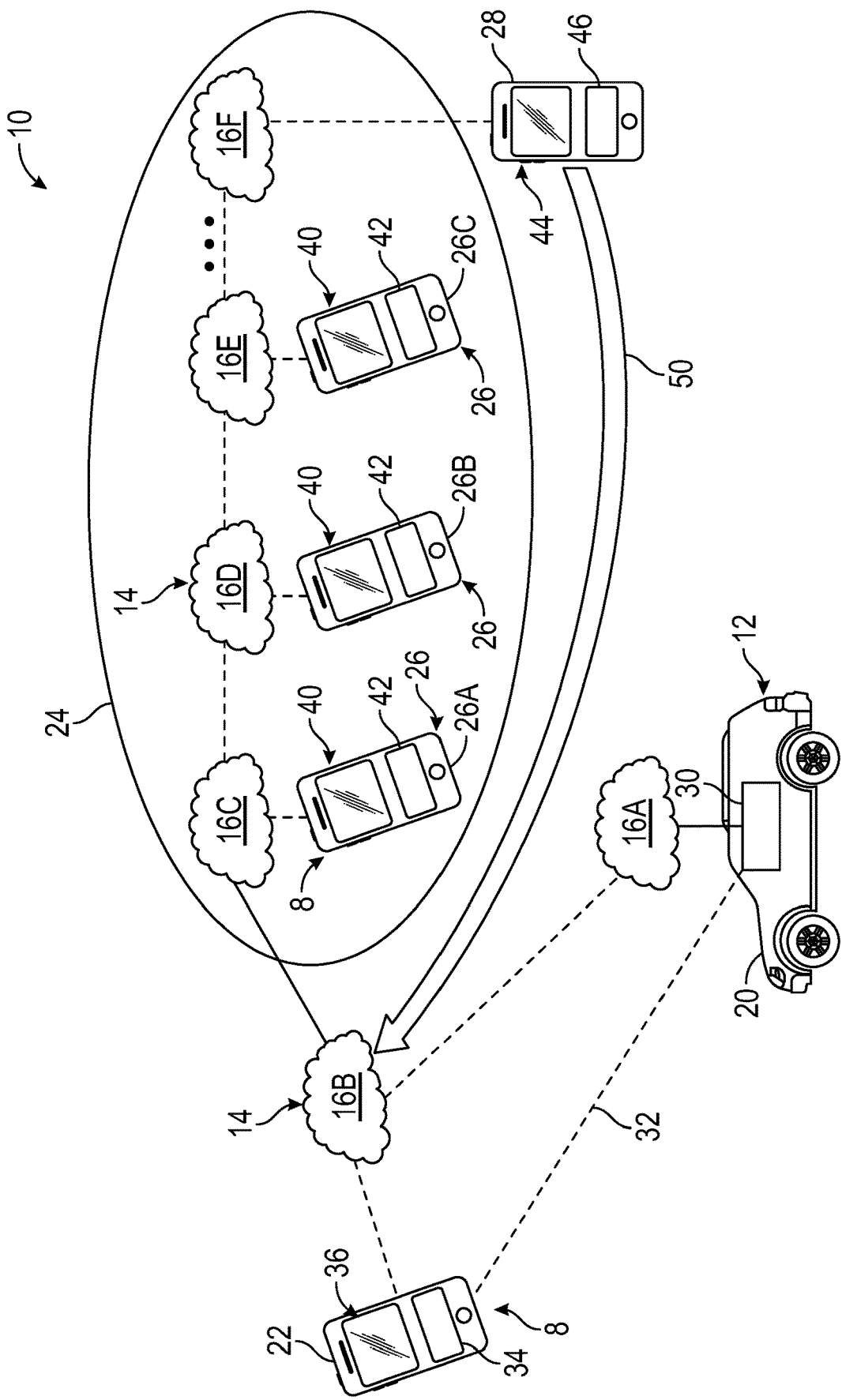
FIG. 1 is a schematic diagram of the disclosed cascaded key delegation system for sharing a digital key including an authenticator device, a requestor device, a cloud delegation service including two or more delegators, and an end user device, according to an exemplary embodiment.

Referring to FIG. 1, an exemplary cascaded key delegation system 10 for sharing a digital key associated with a vehicle 12 is illustrated. The vehicle 12 may be any type of vehicle such as, but not limited to, a sedan, truck, sport utility vehicle, van, ride-share vehicle, or motor home. The cascaded key delegation system 10 includes a plurality of electronic devices 8 in wireless communication with one another by a cloud computing system 14. Specifically, each electronic device 8 that is part of the cascaded key delegation system 10 includes a cloud counterpart 16A-16F, where the cloud counterparts 16A-16F for each electronic device 8 represent one or more remote servers that are owned and controlled by distinct entities. The plurality of electronic devices 8 include an authenticator device 20, a requestor device 22, a cloud delegation service 24 including two or more delegator devices 26, and one or more end user devices 28.

The authenticator device 20 represents the physical structure that the end user device 28 gains access to by the digital key. In the example as shown in the figures, the authenticator device 20 is the vehicle 12 that includes one or more processors 30. However, it is to be appreciated that the figures are merely exemplary in nature and the authenticator device 20 is any structure that requires a digital key for either accessing the structure or to access features of the structure. Some other examples of the authenticator device 20 include, but are not limited to, a garage, a residence, a trailer, a gas pump, a charging station, or a locker. For example, the digital key may unlock the door to a residence, permit access to a gas pump or charging station, open a door to a garage, or allow access to a trailer.

The requestor device 22 include one or more processors 34, where the requestor device 22 represents the electronic device 8 verified by the authenticator device 20 (i.e., the vehicle 12 in the present example) to transmit service requests to the one or more processors 30 of the vehicle 12. The service requests include locking, unlocking, starting, and stopping the vehicle 12 as well as fetching data from the one or more processors 30 of the vehicle 12. The requestor device 22 is in wireless communication with the one or more processors 30 of the vehicle 12 by respective cloud counterparts 16A and 16B of the cloud computing system 14 as well as by a direct wireless link 32. In the example as shown in FIG. 1, the requestor device 22 represents a personal electronic device 36 associated with an owner of the vehicle 12 such as, for example, a smartphone or a tablet. However, as mentioned above, it is to be appreciated that FIG. 1 is merely exemplary in nature, and the requestor device 22 may be a vehicle as well. Specifically, for example, if the authenticator device 20 is a gas pump, a charging station, a garage door, or a trailer, then the requestor device 22 would be a vehicle. In one specific example, if the authenticator device 20 is a garage, then the requestor device 22 would be the vehicle that is authenticated to and is able to open an access door to the garage.

As explained below, the requestor device 22 grants either access rights or delegation rights to the authenticator device 20. The access rights and the delegation rights are verified by a public key certificate. The cascaded key delegation system 10 separates the access rights from the delegation rights to the authenticator device 20. Specifically, the requestor device 22 grants access rights to the end user device 28 and delegation rights to the two or more delegator devices 26 that are part of the cloud delegation service 24. In the example as shown in FIG. 1 where the authenticator device 20 is the vehicle 12, the access rights allow for the end user device 28 to lock the vehicle 12, unlock the vehicle 12, start the vehicle 12, stop the vehicle 12, and access one or more systems and features available on the vehicle 12. In another embodiment, the access rights may be limited to only a portion of the systems and features included in the vehicle 12. For example, the digital key may only grant valet mode access to a user, thereby restricting access to features such as storage areas, the infotainment system, and the ability to drive the vehicle above a predefined speed. The delegation rights allow a delegator device 26 to delegate the delegation rights to another delegator device 26 that is part of the cloud delegation service 24 or to the end user device 28.

It is to be appreciated that each cloud counterpart 16A-16F of the cloud computing system 14 also hosts software that grants access rights and delegation rights independently from the associated electronic device 8. For example, corresponding cloud counterpart 16B grants the delegation rights to cloud counterpart 16C, and then cloud counterpart 16C grants the delegation rights to cloud counterpart 16D, and so on, without the involvement of electronic devices 8. The cloud counterpart 16F may then grant the access rights to the end user device 28, however, as explained below, the end user device 28 will first need to redeem the access rights from the corresponding cloud counterpart 16B before being able to access the vehicle 12.

The cloud delegation service 24 supports a limitless number of delegator devices 26, where the number of supported delegator devices 26 are only limited by the computing capabilities of the delegator devices 26 and their respective corresponding cloud counterparts 16B-16F. Accordingly, it is to be appreciated that the disclosed cascaded key delegation system 10 supports multi-level cascade delegation to a limitless depth. However, it is to be appreciated that in an alternative embodiment the cascaded key delegation system 10 may also limit the number of delegators as well, thereby limiting the depth of the delegation. Furthermore, the cascaded key delegation system 10 provides flexibility and detaches the system architecture from a particular use case. Accordingly, different use cases may be implemented on the same architecture. For example, as mentioned above, in another embodiment the requestor device 22 may be a vehicle and the authenticator device 20 is a personal electronic device.

In the example as shown, the delegator devices 26 that are part of the cloud delegation service 24 are personal electronic device 40 that each include one or more processors 42, however, it is to be appreciated that the delegator devices 26 are not limited to smart devices and in another embodiment the delegator devices 26 may be vehicles. It is to be appreciated that each delegator device 26 is associated with a level of delegation. In the example as shown in FIG. 1, an initial delegator device 26A is associated with a first level of delegation. A second delegator device 26B, which is located downstream of the initial delegator device 26A, is associated with a second level of delegation. A third delegator device 26C, which is located downstream of the second delegator device 26B, is associated with a third level of delegation. The third delegator device 26C is illustrated as the last delegator device 26 in the cloud delegation service 24 that is directly upstream from the end user device 28. Although FIG. 1 illustrates three levels of delegation, it is to be appreciated that the figures are merely exemplary in nature and the cloud delegation service 24 may include different levels of delegation. Furthermore, it is also to be appreciated that each delegator device 26 may also act as an end user device as well, where each delegator device 26 receives the access rights from the corresponding cloud counterpart 16B-16F.

FIG. 1 also illustrates the end user device 28 as a personal electronic device 44 including one or more processors 46. However, it is to be appreciated that the end user device 28 is not limited to smart devices, in another embodiment the end user device 28 is a vehicle. For example, in another embodiment, the authenticator device 20 is a gas pump, the requestor device 22 is a vehicle, and the end user device 28 is another vehicle. Furthermore, although FIG. 1 illustrates a single end user device 28, it is to be appreciated that the cascaded key delegation system 10 may grant access to more than one end user device 28 as well. For example, in one embodiment, the cascaded key delegation system 10 includes a number of allowed redemptions for the access rights, where the number of allowed redemptions represent a number of end user devices 28 that are supported. For example, a rental car company may grant access rights to the vehicle 12 to multiple end user devices 28.

Continuing to refer to FIG. 1, a digital key sharing procedure is performed to grant the delegation rights from one delegator device 26 to another delegator device 26 that is part of the cloud delegation service 24, or to grant delegation rights from the last delegator device 26 that is part of the cloud delegation service 24 to the end user device 28. As explained below, a public key certificate that grants either access rights or delegation rights is issued during the digital key sharing procedure. The public key certificate, which may also be referred to as a digital certificate, is signed by a certificate authority. The certificate authority is a trusted organization that issues the public key certificate. The public key certificate includes the public key associated with the authenticator device 20, identity information of the authenticator device 20, information concerning the certificate authority, a time to live, and a digital signature of the certificate authority. The certificate authority encrypts signature-related data of the digital signature with a private key. The time to live indicates a validity interval of each delegation right. Once the time to live expires for a specific level of delegation, the delegation rights expire, and a notification is sent to the delegator devices 26 located upstream.

The key sharing procedure begins by having the requestor device 22 issue a public key certificate to the initial delegator device 26A that is part of the cloud delegation service 24. The public key certificate enables the initial delegator device 26A to grant the delegation rights to a subsequent delegator device 26 located downstream in the cloud delegation service 24. That is, the public key certificate grants delegation rights to the initial delegator device 26A. The public key certificate is the public key certificate issued directly by and self-signed by the certificate authority.

The initial delegator device 26A then issues an intermediate public key certificate to the second delegator device 26B, where the intermediate public key certificate is signed by the private key of the public key certificate. The intermediate public key certificate grants the delegation rights to the second delegator device 26B. The second delegator device 26B then issues a second intermediate public key certificate the third delegator device 26C, where the second intermediate public key certificate grants the delegation rights to the third delegator device 26C. The third delegator device 26C then issues a leaf public key certificate to the end user device 28, where the leaf public key certificate indicates that the last delegator device 26 endorses the access rights to the authenticator device 20.

In the example as shown in FIG. 1, the end user device 28 then submits a request for access 50 to the requestor device 22 through the corresponding cloud component 16B. The request for access 50 includes the leaf public key certificate, a request for the access rights, and a certificate chain. The certificate chain is an ordered list of public key certificates that start with the public key certificate and end with the leaf public key certificate, where one or more intermediate public key certificates exist between the public key certificate and end with the leaf public key certificate. Although FIG. 1 illustrates the request for access 50 sent to the corresponding cloud component 16B of the requestor device 22, in another embodiment the requestor device 22 directly receives the request for access 50.

In response to receiving the request for access 50, the requestor device 22 confirms the request for access 50 is valid. The requestor device 22 confirms the request for access 50 is valid by checking the certificate chain against a certificate revocation list. The certificate revocation list includes any public key certificates where access rights or delegation rights have been revoked. In response to determining the request for access 50 is valid, the requestor device 22 then grants the access rights to the end user device 28. In response to determining the request for access 50 is invalid, the requestor device 22 declines access rights to the end user device 28. In an embodiment, the requestor device 22 revokes a public key certificate granting access rights or delegation rights, which is described below.

Each time a new delegator device 26 is introduced to the certificate chain, certificate-based routing is established to notify the existing electronic devices 8 of the new delegator device 26. Specifically, the existing electronic devices 8 receive a notification indicating a new delegation has been introduced to the cascaded key delegation system 10. The notification is protected by established secure channels between the electronic devices 8.

Figure 2A:
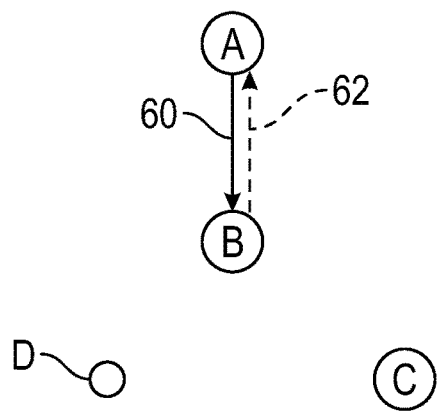
FIGS. 2A-2C show a diagram illustrating certificate-based routing between nodes A, B, C, and D, according to an exemplary embodiment.
Figure 2B:
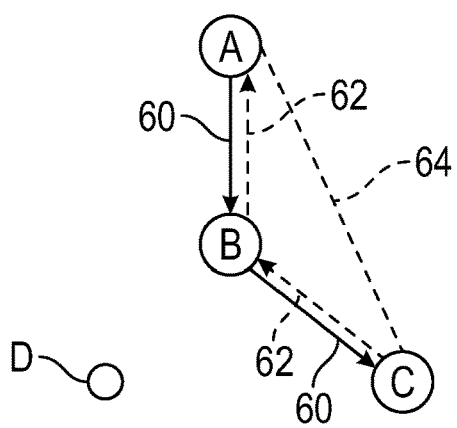
Figure 2C:
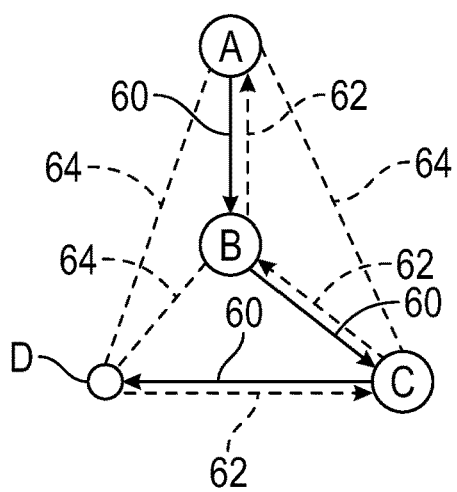

Referring now to FIGS. 2A-2C, a diagram illustrating the certificate-based routing is shown, where four exemplary electronic devices are shown as nodes A, B, C, and D. Certificate-based routing is established by notifying parent nodes of new delegations. Referring specifically to FIG. 2A, node A and node B are mutually authenticated or cross-signed, where a direct link 60 and a backward synchronization link 62 are established between node A and node B. Turning now to FIG. 2B, node B and node C are also cross-signed, where a direct link 60 and a backward synchronization link 62 are established between node B and node C. Node A is also notified of the new delegation between node B and node C, where a communication link 64 is provided between node A and node C. Therefore, if the links 60, 62 between node B and node C are broken, then node A may communicate with node C over the communication link 64. Finally, as seen in FIG. 2C, node C and node D are cross-signed, where a direct link 60 and a backward synchronization link 62 are established between node C and node D. Nodes A and B are notified of the new delegation between node C and node D, where a communication link 64 is provided between node A and node D and between node B and node D.

Referring to FIGS. 1 and 2A-2C, it is to be appreciated that the electronic devices 8 that are directly adjacent to one another (i.e., nodes A and B, nodes B and C, and nodes C and D) are cross-signed, however, the cascaded key delegation system 10 does not require each electronic device 8 to be cross-signed with the remaining devices 8 that are part of the cascaded key delegation system Each node or electronic device 8 communicates directly with another electronic device 8 that is part of the cascaded key delegation system 10, even if the corresponding electronic devices 8 are not cross-signed. Furthermore, in the event one of the delegator devices 26 are offline, a different path may be used to communicate between the electronic devices 8. For example, referring to FIG. 2C, in the event node B is taken offline, node C may still communicate with node A through the communication link 64. Thus, it is to be appreciated that the cascaded key delegation system 10 is a fault-tolerant system.

In one embodiment, the digital key at the requestor device 22 is revoked. When the digital key is revoked, the requestor device 22 will not grant access rights to the end user device 28 in response to receiving the request for access 50. However, in some instances, the requestor device 22 has already granted access rights to the end user device 28. In response to determining that the access rights have already been granted to the end user device 28, the requestor device 22 revokes the delegation rights granted to each of the delegator devices 26 that are part of the cloud delegation service 24. The requestor device 22 also revokes the access rights and transmits an updated certificate revocation list to the one or more processors 30 of the vehicle 12. The updated certificate revocation list includes the end user device 28. Thus, the vehicle 12 will deny access to the end user device 28 in the event the end user device 28 attempts to access the vehicle 12.

Figure 3:
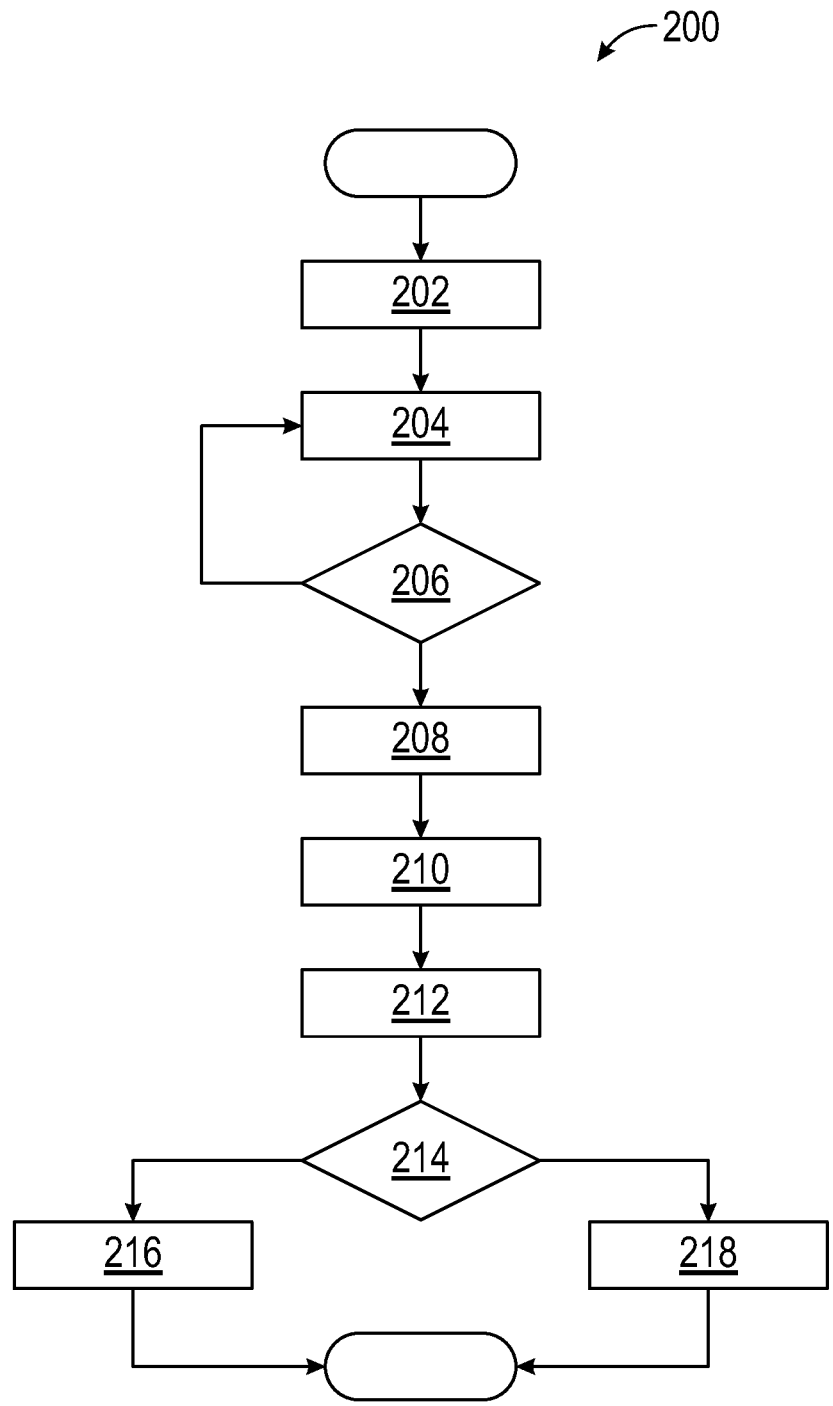
FIG. 3 is a process flow diagram illustrating a method for sharing a digital key associated with a vehicle by a cascaded key delegation system, according to an exemplary embodiment.

FIG. 3 is an exemplary process flow diagram illustrating a method 200 for sharing the digital key associated with the vehicle 12 by the cascaded key delegation system 10. Referring to FIGS. 1 and 3, the method 200 may begin at block 202. In block 202, the requestor device 22 issues the public key certificate to the initial delegator device 26A that is part of the cloud delegation service 24, where the public key certificate enables the initial delegator device 26A to grant the delegation rights to a subsequent delegator device 26 located downstream in the cloud delegation service 24. The method 200 may then proceed to block 204.

In block 204, the initial delegator device 26A issues the intermediate public key certificate to a subsequent delegator device 26B. The intermediate public key certificate grants the delegation rights to the subsequent delegator device 26B. The method 200 may then proceed to decision block 206.

In decision block 206, if the subsequent delegator device 26B is the last delegator device 26 of the cloud delegation service 24, then the method may proceed to block 208. Otherwise, the method 200 may return to block 204.

In block 208, the last delegator device 26 that is part of the cloud delegation service 24 issues a leaf public key certificate to the end user device 28, where the leaf public key certificate indicates that the last delegator device 26 endorses the access rights to the authenticator device 20. The method 200 may then proceed to block 210.

In block 210, the end user device 28 submits the request for access 50 to the requestor device 22, where the request for access 50 includes the leaf public key certificate, a request for the access rights, and a certificate chain. The method 200 may then proceed to block 212.

In block 212, in response to receiving the request for access 50, the requestor device 22 confirms the validity of the request for access 50 by checking the certificate chain against a certificate revocation list. The method 200 may then proceed to decision block 214.

In decision block 214, in response to determining the request for access 50 is valid, the method 200 proceeds to block 216. In block 216, the requestor device 22 then grants access rights to the end user device 28. The method 200 may then terminate. Referring back to decision block 214, in response to determining the request for access 50 is invalid, the method 200 proceeds to block 218. In block 218, the requestor device 22 declines access rights to the end user device 28. The method 200 may then terminate.

Referring generally to the figures, the disclosed cascaded key delegation system provides various technical effects and benefits. Specifically, the cascaded key delegation system simplifies the involvement of a vehicle owner when granting either access rights or delegation rights to the vehicle. The cascaded key delegation system is a fault-tolerant system, which means that if one or more of the delegators that are part of the cloud delegation service go offline or are no longer available, the remaining delegators may still communicate with one another. Moreover, the cascaded key delegation system separates the delegation rights from the access rights, where the access rights are granted to the end user. It is also to be appreciated that the cascaded key delegation system includes a system architecture that is independent from use cases. Accordingly, the cascaded key delegation system may be used in a variety of different applications and is not limited to a vehicle.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for sharing a digital key associated with a vehicle by a cascaded key delegation system, the method comprising:
   issuing, by a requestor device, a public key certificate to an initial delegator device that is part of a cloud delegation service, wherein the public key certificate enables the initial delegator device to grant delegation rights to the vehicle;
   issuing, by the initial delegator device, an intermediate public key certificate to a subsequent delegator device that is part of the cloud delegation service, wherein the intermediate public key certificate grants the delegation rights to the subsequent delegator device, and the subsequent delegator device is a last delegator device of the cloud delegation service;
   issuing, by the last delegator device, a leaf public key certificate to an end user device, wherein the leaf public key certificate indicates that the last delegator device endorses access rights to the vehicle; and
   submitting, by the end user device to the requestor device, a request for access to the vehicle, wherein the request for access to the vehicle includes the leaf public key certificate, a request for access rights, and a certificate chain that is an ordered list of public key certificates that start with the public key certificate and end with the leaf public key certificate.

2. The method of claim 1, wherein the method comprises: in response to receiving the request for access, confirming, by the requestor device, a validity of the request for access; and
   in response to determining the request for access is valid, granting, by the requestor device, access rights to the end user device.

3. The method of claim 2, wherein confirming the validity of the request for access includes checking the certificate chain against a certificate revocation list.

4. The method of claim 2, wherein the digital key at the requestor device is revoked, and wherein the method comprises:
   determine the access rights have already been granted to the end user device; and
   in response to determining that the access rights have already been granted to the end user device, revoke, by the requestor device, the access rights to the end user device.

5. The method of claim 4, wherein the method further comprises:
   transmitting, by the requestor device, an updated certificate revocation list to one or more processors of the vehicle, wherein the updated certificate revocation list includes the end user device.

6. A cascaded key delegation system for sharing a digital key associated with a vehicle, the cascaded key delegation system comprising:
   a requestor device authenticated by the vehicle, wherein the requestor device includes one or more processors that transmit service requests to one or more processors of the vehicle, wherein the requestor device is in wireless communication with a cloud delegation service including two or more delegator devices and a corresponding cloud counterpart associated with the requestor device that includes one or more remote servers, wherein the one or more remote servers execute instructions to:
   issue a public key certificate to an initial delegator device of the cloud delegation service, wherein the public key certificate enables the initial delegator device to grant delegation rights to a subsequent delegator device located downstream of the initial delegator device in the cloud delegation service, and
   wherein the initial delegator device issues an intermediate public key certificate to the subsequent delegator device and the subsequent delegator device is a last delegator device of the cloud delegation service and the subsequent delegator device issues a leaf public key certificate to an end user device in wireless communication with the cloud delegation service, and
   wherein the leaf public key certificate indicates that the subsequent delegator device endorses access rights to the vehicle, and
   wherein the end user device submits, to a cloud counterpart of the requestor device, a request for access to the vehicle,
   wherein the request for access includes the leaf public key certificate, a request for access rights, and a certificate chain that is an ordered list of public key certificates that start with the public key certificate and end with the leaf public key certificate.

7. The cascaded key delegation system of claim 6, wherein one or more intermediate public key certificates exist between the public key certificate and end with the leaf public key certificate.

8. The cascaded key delegation system of claim 6, wherein the access rights are separate from the delegation rights to the vehicle.

9. The cascaded key delegation system of claim 6, wherein the access rights allow for the end user device to perform one or more of: lock the vehicle, unlock the vehicle, start the vehicle, stop the vehicle, and access one or more systems and features available on the vehicle.

10. The cascaded key delegation system of claim 6, wherein the cloud delegation service supports a limitless number of delegators.

11. The cascaded key delegation system of claim 6, wherein the requestor device represents a personal electronic device including the one or more processors, and wherein the personal electronic device is associated with an owner of the vehicle.

12. The cascaded key delegation system of claim 6, wherein the end user device is one of the following: a personal electronic device including the one or more processors and another vehicle.

13. The cascaded key delegation system of claim 6, wherein the cascaded key delegation system includes a number of allowed redemptions for the access rights, and wherein the number of allowed redemptions represent a number of end user devices that are supported by the cascaded key delegation system.

14. The cascaded key delegation system of claim 6, wherein the service requests include one or more of the following: locking the vehicle, unlocking the vehicle, starting the vehicle, stopping the vehicle, and fetching data from the one or more processors of the vehicle.

15. A cascaded key delegation system for sharing a digital key associated with a vehicle, the cascaded key delegation system comprising:
a requestor device authenticated by the vehicle, wherein the requestor device includes one or more processors that execute instructions to transmit service requests to one or more processors of the vehicle;
a cloud delegation service in wireless communication with the requestor device, wherein the cloud delegation service includes two or more delegator devices;
one or more end user devices in wireless communication with the cloud delegation service, wherein the one or more end user devices are granted access rights to the vehicle; and
a corresponding cloud counterpart associated with the requestor device, wherein the corresponding cloud counterpart includes one or more remote servers, and wherein the one or more remote servers execute instructions to:
issue a public key certificate to an initial delegator device of the cloud delegation service, wherein the public key certificate enables the initial delegator device to grant delegation rights to a subsequent delegator device located downstream of the initial delegator device in the cloud delegation service, and
wherein the initial delegator device issues an intermediate public key certificate to the subsequent delegator device and the subsequent delegator device is a last delegator device of the cloud delegation service and the subsequent delegator device issues a leaf public key certificate to an end user device in wireless communication with the cloud delegation service, and
wherein the leaf public key certificate indicates that the subsequent delegator device endorses access rights to the vehicle, and
wherein the end user device submits, to a cloud counterpart of the requestor device, a request for access to the vehicle, and
wherein the request for access includes the leaf public key certificate, a request for access rights, and a certificate chain that is an ordered list of public key certificates that start with the public key certificate and end with the leaf public key certificate.

16. The cascaded key delegation system of claim 15, wherein the requestor device represents a personal electronic device including the one or more processors, and wherein the personal electronic device is associated with an owner of the vehicle.

17. The cascaded key delegation system of claim 15, wherein the end user device is one of the following: a personal electronic device including the one or more processors and another vehicle.

18. The cascaded key delegation system of claim 15, wherein the cascaded key delegation system includes a number of allowed redemptions for the access rights, and wherein the number of allowed redemptions represent a number of end user devices that are supported by the cascaded key delegation system.

19. The cascaded key delegation system of claim 15, wherein the service requests include one or more of the following: locking the vehicle, unlocking the vehicle, starting the vehicle, stopping the vehicle, and fetching data from the one or more processors of the vehicle.

* * * * *